Figure 1:
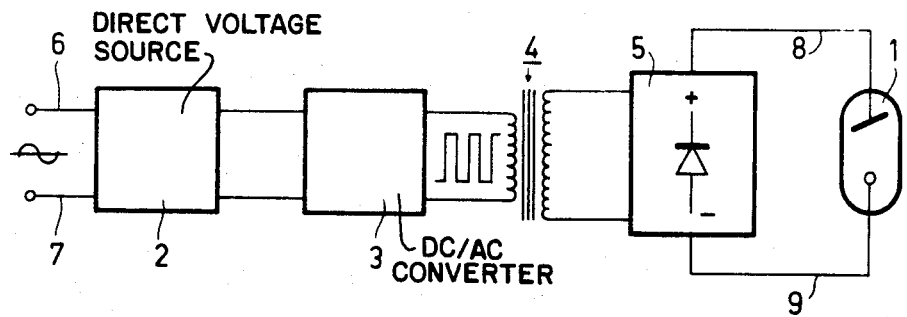

United States Patent [19]

Mudde

[11] Patent Number: 4,545,005
[45] Date of Patent: Oct. 1, 1985

[54] HIGH-VOLTAGE SUPPLY FOR AN X-RAY GENERATOR

[75] Inventor: Leo M. Mudde, Eindhoven, Netherlands

[73] Assignee: U.S. Philips Corporation, New York, N.Y.

[21] Appl. No.: 459,855

[22] Filed: Jan. 21, 1983

[30] Foreign Application Priority Data

Jan. 22, 1982 [NL] Netherlands ............ 8200233

[51] Int. Cl.[4] ............................................. H02N 7/06
[52] U.S. Cl. ....................................... 363/68; 363/126
[58] Field of Search ................. 363/15, 16, 44, 45, 363/65, 66, 67, 68, 125, 126, 39, 56; 323/358, 359; 336/170, 84 C; 378/91

[56] References Cited

U.S. PATENT DOCUMENTS

| | | | |
|---|---|---|---|
| 3,340,458 | 9/1967 | Keller | 363/48 |
| 3,363,165 | 1/1968 | Wilkinson | 363/68 |
| 4,013,936 | 3/1977 | Hesler et al. | 363/65 |
| 4,066,955 | 1/1978 | Suthers | 363/68 |
| 4,176,310 | 11/1979 | Elenga et al. | 323/328 |
| 4,271,463 | 6/1981 | Tanimura et al. | 363/126 |
| 4,274,136 | 6/1981 | Onodera et al. | 363/68 |

Primary Examiner—Peter S. Wong
Assistant Examiner—Judson H. Jones
Attorney, Agent, or Firm—Robert T. Mayer; Bernard Franzblau

[57] ABSTRACT

In order to increase the resonance frequency of a transformer, the secondary winding is divided into several (identical) coils, which are each connected to a corresponding individual bridge rectifier circuit. The outputs of the bridge rectifier circuits are connected in series and each coil is wound in a sense opposite to that of the immediately adjacent coil(s). Each coil is divided into two series-connected sections which are each wound in a corresponding individual winding compartment of the coil former. The series connection between the two coil sections extends through a passage at the bottom of the partition wall between the two winding compartments. Consequently, the coil ends are located on the outside of each coil section so that it is possible to provide a simple connection with short connecting leads.

12 Claims, 3 Drawing Figures

HIGH-VOLTAGE SUPPLY FOR AN X-RAY GENERATOR

The invention relates to a high-voltage supply for an X-ray generator comprising a direct voltage source, a converter for producing a voltage varying with time from the direct voltage of the source and a high-voltage transformer with a rectifier circuit connected thereto for producing a direct voltage which is high with respect to the direct voltage of the source, a secondary winding being divided into a plurality of coils which are each included in a corresponding individual bridge rectifier circuit, the outputs of the rectifier circuits being connected in series.

Such high-voltage supplies are known from U.S. Pat. Nos. 3,363,165 and 4,176,310. The U.S. Pat. No. 3,363,165 discloses a high-voltage supply in which measures have been taken to limit the weight of the transformer core used and of the quantity of the insulating materials used. The U.S. Pat. No. 4,176,310 discloses further measures to avoid (damped) oscillations in the secondary of the high-voltage transformer. The frequency of the oscillations is determined by the leakage inductance and the stray capacitance of the high-voltage transformer. The said frequency will also determine the value (in nF) of the (smoothing) capacitor which has to be used to smooth the high-voltage from the high-voltage transformer after rectification by the rectifier circuit in order to reduce the voltage ripple present in the rectified voltage. The capacitance of the high-voltage smoothing capacitor can be made smaller as the frequency of the rectified voltage is increased so that the voltage ripple will remain unchanged, or the ripple in the rectified voltage can be reduced as the frequency of the voltage is increased when the capacitance remains unaltered.

An object of the invention is to provide a high-voltage supply in which the resonance frequency of the high-voltage transformer, determined by the leakage inductance and the stray capacitance, is considerably higher than for a normal high-voltage transformer used hitherto.

The high-voltage supply according to the invention is therefore characterized in that the secondary winding of the high-voltage transformer comprises a plurality of electrically distinct coils which are arranged in sequence side by side along the core of the high-voltage transformer, and each coil is connected to a corresponding one of a plurality of individual bridge rectifier circuits whose rectified outputs are connected in series of the same sequence, the winding senses of immediately adjacent coils being opposite to one another. By dividing the secondary winding into several coils, which are each included in a corresponding bridge rectifier circuit, the self capacitance is considerably reduced because the mid-points of the coils remain at a steady (direct) voltage relative to each other so that the stray capacitance present between them no longer contributes to the alternating current behaviour of the high-voltage transformer. It has further been found that the leakage inductance can be reduced by choosing the winding senses of immediately adjacent coils so as to be opposite to one another.

An embodiment of a high-voltage supply according to the invention is characterized in that each coil consists of two coil sections wound in different adjacent winding compartments of a coil former, an electrical connection being established between the ends of the windings forming the respective coil sections which are disposed at the bottom of each of the winding compartments. This embodiment has the advantage that the mid-points of the coils which remain at a steady (direct) voltage with respect to ground (and with respect to the primary coil, around which the secondary is generally arranged) need only be insulated with respect to that voltage. The direct voltage at the mid-points is lower than the (high)-voltage produced by the transformer secondary (i.e. the voltage produced across half of the entire secondary winding) so that less stringent requirements are imposed upon the insulation.

Figure 2:
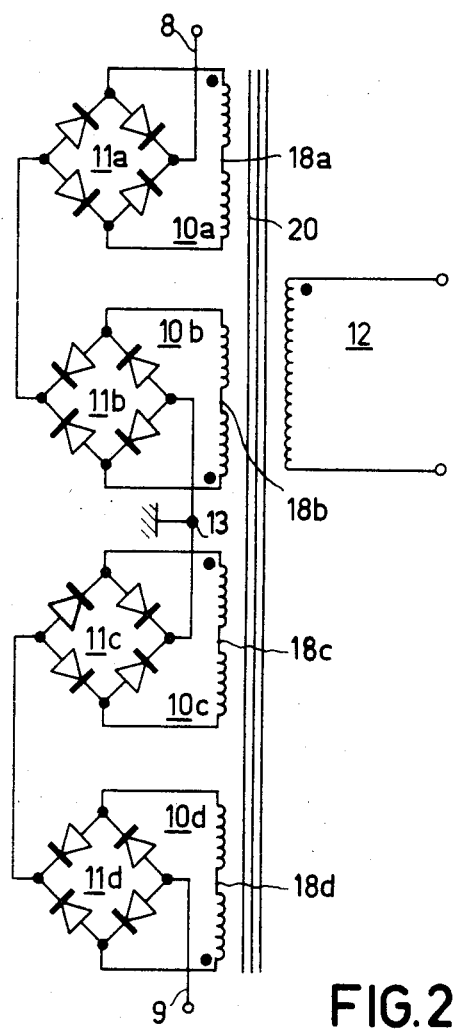
Figure 3:
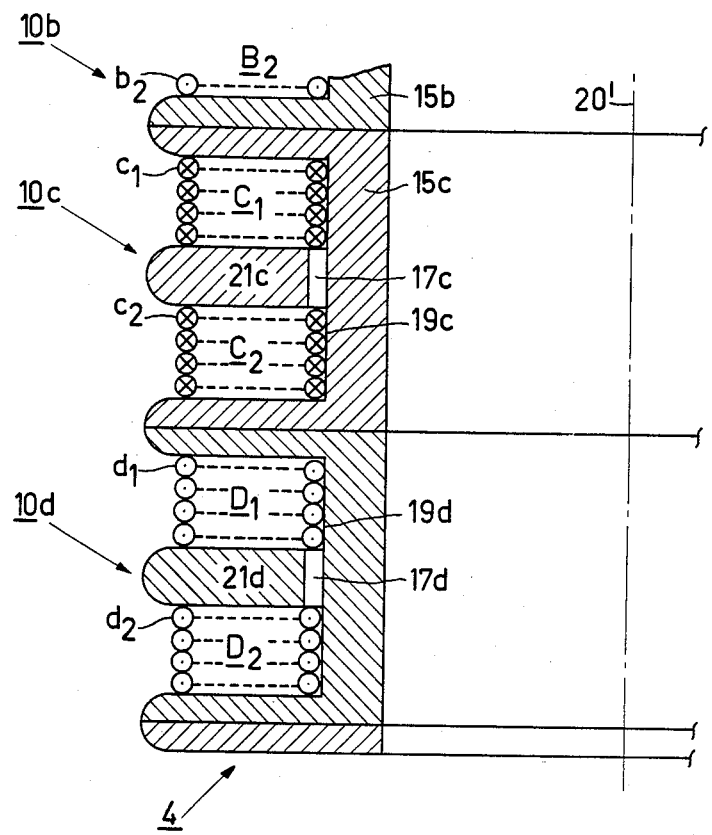

The invention will be described more fully with reference to an embodiment shown in the drawing, in which:

FIG. 1 shows a block circuit diagram of a high-voltage supply for an X-ray generator, FIG. 2 shows an electrical circuit diagram of the high-voltage transformer with a rectifier circuit in accordance with the invention, and FIG. 3 is a sectional view of a portion of a high-voltage transformer in accordance with the invention.

The X-ray generator shown in FIG. 1 comprises a high-voltage supply (2, 3, 4, 5) and an X-ray tube 1. The high-voltage supply (2, 3, 4, 5) comprises a direct voltage source 2, a converter 3, a high-voltage transformer 4 and a rectifier circuit 5. The direct voltage source 2 may be an accumulator, or it may be a rectifier unit known per se which is connected via the connection points 6 and 7 to the public AC voltage supply. The converter 3 converts the direct voltage of the source 2 into an alternating voltage at a frequency of a few kHz. The voltage wave form may be a sinusoid or a square wave or some intermediate wave form. This voltage varying with time is converted by the transformer 4 into a high-voltage which is rectified by the rectifier circuit 5 so as to provide the supply voltage for the X-ray tube 1.

The frequency of the voltage to be transformed by the transformer 4 is many times higher than the frequency of the supply voltage at the connection points 6 and 7. As the frequency of the sinusoidal voltage is increased, the capacitance which is required to smooth the rectified high-voltage can be accordingly reduced. The high-voltage leads 8 and 9, through which the X-ray source 1 is connected to the rectifier circuit 5, constitute a capacitance (with respect to ground). Substantially independent of the frequency of a square wave voltage, the capacitance of the (in practice short) high-voltage leads 8 and 9 is sufficient to smooth the high-voltage.

The resonance frequency of the transformer 4 limits the frequency of the voltage (which latter must be considerably lower). When a square wave voltage is used, the non-ideal behaviour of the high-voltage transformer 4 (and the supply leads and other components connected thereto) involves a rise time and a decay time at the beginning and at the end, respectively, of each square wave. When the duration of the voltage square wave is decreased, however, the rise time and the decay time will remain unchanged, as a result of which the ideal square waveform will be lost. Consequently, a high-voltage transformer has to be provided which has a higher resonance frequency than high-voltage transformers used hiterto.

FIG. 2 shows an electrical circuit diagram of a transformer 4 (in this example with four coils) with a rectifier circuit 5 of a high-voltage supply in accordance with the invention. In order to increase the resonance frequency of the transformer 4, the secondary winding is divided into several coils 10a, b, c, d, which are connected in series through bridge rectifier circuits 11a, b, c, d. The coils 10a and c have the same winding sense as the primary winding 12, whereas the coils 10b and 10d have an opposite winding sense. In FIG. 2, this is indicated by means of the known symbol dot symbol on the windings. The bridge rectifier circuits 11a, b, c and d connect the voltage produced in the coils 10a, b, c and d in series so that the sum of the absolute values of the voltages produced in the coils 10a, b, c and d is produced across the high-voltage leads 8 and 9, the high-voltage lead 8 having a steady positive potential and the lead 9 a negative potential with respect to the ground connection 13.

FIG. 3 shows a part of the construction of the high-voltage coil of the high-voltage transformer 4. Each coil 10a, b, c, d is wound onto a coil former 15a, b, c, d (shown only in part). The coils 10b and 10d have the same winding sense, which is opposite to the winding sense of the coil 10a (not shown) and 10c which is indicated with $\odot$ and $\otimes$ symbols, respectively. The coils 10a, b, c and d are each divided into two coil sections, the sections b2; c1; c2; d1; d2 of which are shown. The coil sections are each wound in a separate winding compartment (A1; A2; B1; B2; C1; C2; D1; D2) of the coil formers (15a, b, c, d). The winding compartment of each coil former are interconnected through a passage 17a–17d, only 17c and 17d being shown in FIG. 3. The passages 17c and 17d are provided in the partition walls (21c, d) to correspond approximately with the inner winding surfaces (19c, d) of the winding compartments (C1; C2; D1; D2). The coil sections (c1; c2; d1; d2) of a coil 10c, 10d are interconnected through the passage 17c, d).

The construction of the high-voltage coil and rectifier circuit of the high-voltage transformer shown in FIGS. 2 and 3 has the following advantages:

The immediately adjacent coils have an opposite winding sense, as a result of which the leakage inductance is decreased and hence the resonance frequency is increased.

The mid-points interconnections 18a, b, c, d (FIG. 2), which interconnect the coil sections a1, a2, b1, b2, c1, c2, d1, d2 through the passages 17a, b, c, d (FIG. 3), will each be at a respective constant voltage. This yields the advantage that the mid-point connections 18a, b, c, d carrying the respective constant voltage and the immediately following windings disposed at the bottom 19c, d of the winding compartments C1, C2, D1, D2 need only be insulated from the transformer core 20, which in FIG. 3 is indicated only symbolically with a centre line 20' or from the primary windings 12 arranged to surround them, to an extent relating to these voltages. These substantially constant voltages are considerably lower than the ultimately produced high-voltage at the leads 8 and 9. If each coil 10a, b, c, d for example, provides 25 kV, the leads 8 and 9 will have a potential of +50 kV and −50 kV, respectively, the midpoints connections 18a, b, c and 18d, however, will each convey a direct voltage of +37.5 kV, +12.5 kV, −12.5 kV and −37.5 kV, respectively. The insulation of the coils 10a, b, c, d need not be very thick so that the distance between the primary winding 12 and the secondary coils 10a, b, c, and d can be made smaller. As a result, also the leakage inductance of the high-voltage transformer 4 will decrease.

A further important advantage is that the ends of the coils formed by the sectional windings a1, a2, b1, b2, c1, c2, d1, d2 are provided at the outer ends of the winding sections in the winding compartments A1, A2, B1, B2, C1, C2, D1, D2, as a result of which they can be connected to the rectifier circuits 11a, b, c, d in a simple manner and through short connections.

What is claimed is:

1. A high-voltage supply for an X-ray generator comprising a direct voltage source, a converter for producing a voltage varying with time from the direct voltage of the source, a high voltage transformer having a secondary winding divided into a plurality of coils which are each included in a corresponding individual bridge rectifier circuit, means connecting the outputs of the rectifier circuits in series, characterized in that the secondary winding of the high-voltage transformer comprises a plurality of electrically distinct coils which are arranged in sequence side by side along the core of the high-voltage transformer, and each coil is connected to a corresponding one of a plurality of individual bridge rectifier circuits whose rectified outputs are connected in series of the same sequence, the winding senses of immediately adjacent coils being opposite to one another.

2. A high voltage supply as claimed in claim 1, characterized in that each coil comprises two coil sections wound in different adjacent compartments of a coil former, an electrical connection being established between the ends of the windings forming the respective coil sections which are disposed at the bottom of each of the two compartments, the two ends of the coil being located on the outer sides of the compartments.

3. A high-voltage supply as claimed in claim 1, characterized in that the number of coils is even and includes at least four coils and constitutes with the corresponding bridge rectifier circuits two identical series-connected subcircuits, the series connection between the two subcircuits being grounded.

4. A high voltage supply as claimed in claim 2 comprising an even number of coils with at least four coils, said coils and the corresponding bridge rectifier circuits comprising two identical series connected subcircuits with a series connection between the two subcircuits being grounded.

5. A high-voltage DC supply comprising: a pair of input terminals for connection to a time-varying source of voltage of a frequency above 60 Hz, a high-voltage transformer having a magnetic core with a primary winding thereon that is coupled to said input terminals and a secondary winding divided into a plurality of electrically distinct coils arranged in sequence side-by-side along the core of the transformer, a plurality of bridge rectifier circuits each having input terminals and output terminals, means connecting each of said coils to input terminals of a corresponding respective bridge rectifier circuit, means connecting the output terminals of the bridge rectifier circuits in series-aiding relationship to a pair of high-voltage DC output terminals, and wherein the coils of the secondary winding are wound on the core so that the winding senses of adjacent coils are opposite to one another.

6. A high-voltage DC supply as claimed in claim 5 wherein the transformer includes a coil former having a plurality of compartments arranged in sequence side-by-side along the transformer core, and wherein each secondary coil comprises two coil sections would in different adjacent compartments of the coil former such that an electrical connection is formed between ends of respective coil sections disposed at the bottom of each of said two adjacent compartments, and wherein the two ends of a coil are located on the outer sides of the respective compartments.

7. A high-voltage DC supply as claimed in claim 6 wherein adjacent compartments for a coil are in communication via an opening near the bottom of a partition wall separating said adjacent coil former compartments thereby to enable said electrical connections to be formed between said ends of respective coil sections of a secondary coil.

8. A high-voltage DC supply as claimed in claim 5 comprising an even number of coils of at least four coils, said coils and the corresponding bridge rectifier circuits comprising two identical series connected subcircuits with a connection between the two subcircuits connected to ground.

9. A high voltage DC supply comprising: a pair of input terminals for connection to a time-varying source of voltage, a high-voltage transformer having a core with a primary winding thereon coupled to said input terminals and a secondary winding divided into a plurality of electrically distinct coils arranged in sequence side-by-side along the core of the transformer, a corresponding plurality of bridge rectifier circuits, each of said coils being connected to a respective one of said bridge rectifier circuits, means connecting output terminals of the bridge rectifier circuits in series-aiding relationship to a pair of high voltage DC output terminals, and wherein the coils of the secondary winding are wound on the core so that adjacent coils are wound in the opposite sense to one another so as to reduce the transformer leakage inductance.

10. A high voltage DC supply as claimed in claim 9 wherein the transformer further comprises a plurality of coil formers arranged in sequence side-by-side along the transformer core with each coil former having a partition wall that divides the coil former into two adjacent compartments, each secondary coil comprising two coil sections wound in individual adjacent compartments of its coil former and in the same winding sense, and wherein an electrical connection is formed between ends of respective coil sections disposed at the bottom of each of said two adjacent compartments.

11. A high voltage DC supply as claimed in claim 10 wherein adjacent compartments of a coil former are in communication via an opening near the bottom of the partition wall separating said adjacent coil former compartments thereby to enable said electrical connections to be formed between said ends of respective coil sections of a secondary coil.

12. A high voltage DC supply as claimed in claim 9 further comprising a source of DC voltage and a DC/AC converter connected in cascade to said pair of input terminals to supply thereto said time-varying source of voltage.

* * * * *